(12) United States Patent
Schweichart et al.

(10) Patent No.: US 9,722,469 B2
(45) Date of Patent: Aug. 1, 2017

(54) HOUSING OF A DRIVING DEVICE

(71) Applicant: BROSE FAHRZEUGTEILE GMBH & CO. KOMMANDITGESELLSCHAFT, WUERZBURG, Wuerzburg (DE)

(72) Inventors: Andreas Schweichart, Veitschoechheim (DE); Peter Klingler, Neubrunn (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 123 days.

(21) Appl. No.: 14/738,014

(22) Filed: Jun. 12, 2015

(65) Prior Publication Data

US 2015/0280511 A1 Oct. 1, 2015

Related U.S. Application Data

(63) Continuation of application No. 13/721,376, filed on Dec. 20, 2012, now Pat. No. 9,197,108.

(30) Foreign Application Priority Data

Dec. 20, 2011 (DE) .................. 10 2011 121 716

(51) Int. Cl.
*H02K 5/04* (2006.01)
*H02K 5/10* (2006.01)
*H02K 7/116* (2006.01)

(52) U.S. Cl.
CPC ............ *H02K 5/10* (2013.01); *H02K 7/1166* (2013.01); *H02K 5/04* (2013.01); *H02K 2205/09* (2013.01)

(58) Field of Classification Search
CPC .......... H02K 5/10; H02K 7/1166; H02K 5/04; H02K 2205/09
USPC ............. 310/88; 215/261; 220/373; 277/637
See application file for complete search history.

(56) References Cited

U.S. PATENT DOCUMENTS

| | | | |
|---|---|---|---|
| 4,794,942 | A | 1/1989 | Yasuda et al. |
| 5,215,312 | A | 6/1993 | Knappe et al. |
| 5,668,422 | A | 9/1997 | Deynet |
| 6,056,439 | A | 5/2000 | Graham |
| 8,292,109 | B2 | 10/2012 | Lauk et al. |
| 8,356,520 | B2 | 1/2013 | Hurst et al. |
| 8,373,322 | B2 | 2/2013 | Wegner et al. |
| 2011/0016836 | A1 | 1/2011 | Yano |

FOREIGN PATENT DOCUMENTS

| | | |
|---|---|---|
| CN | 101517290 A | 8/2009 |
| CN | 101689784 A | 3/2010 |
| CN | 102084578 A | 6/2011 |
| DE | 3716912 A1 | 12/1988 |
| DE | 9107992 U1 | 1/1992 |
| DE | 19635180 A1 | 3/1998 |
| DE | 102007052150 A1 | 5/2009 |

(Continued)

*Primary Examiner* — Burton Mullins
(74) *Attorney, Agent, or Firm* — Laurence A. Greenberg; Werner H. Stemer; Ralph E. Locher

(57) ABSTRACT

A housing of a driving device, in particular an electric motor adjustment drive for a motor vehicle, has a housing opening, which is covered by a gas-permeable membrane, in particular a membrane that is impermeable to liquid. The housing opening is surrounded by a collar contour, which is interrupted locally at the circumference and within which the membrane lies.

11 Claims, 1 Drawing Sheet

(56) References Cited

FOREIGN PATENT DOCUMENTS

| | | | |
|---|---|---|---|
| DE | 102008001594 | A1 | 11/2009 |
| WO | 8809422 | A1 | 12/1988 |
| WO | 2009135720 | A1 | 11/2009 |

HOUSING OF A DRIVING DEVICE

CROSS-REFERENCE TO RELATED APPLICATION

The application is a continuation of U.S. patent application Ser. No. 13/721,376, filed on Dec. 20, 2012, now U.S. Pat. No. 9,197,108; the application also claims the priority, under 35 U.S.C. §119, of German application DE 10 2011 121 716.2, filed Dec. 20, 2011; the prior applications are herewith incorporated by reference in their entireties.

BACKGROUND OF THE INVENTION

Field of the Invention

The invention relates to a housing of a driving device, in particular an electric motor adjustment drive for a motor vehicle, having a housing opening, which is covered by a gas-permeable membrane, in particular a membrane that is impermeable to liquid.

A driving device, which drives an actuating element between two end positions along an adjustment path as an electric motor adjustment drive for a motor vehicle for example, generally contains an electric motor and a gear coupled to the latter, the gear being arranged in a drive or gear housing. The gear housing is connected to the motor housing (pole can or casing), usually via a flange-type sealed connection. Driving devices of this kind, in particular window lifter drives, are generally exposed in certain circumstances to extreme humidity and high temperature fluctuations in the intended location of installation.

In order to produce a pressure equalization between the interior of the housing and the environment or exterior of the housing, published, non-prosecuted German patent application DE 37 16 912 A1, for example, discloses a gear housing having, in the area of the transition to the motor housing, a housing opening that connects the interior of the housing to the exterior. The housing opening is covered by a membrane that is permeable to air and impermeable to water. For this purpose, the membrane lies in a housing recess, into which the housing opening opens. In this arrangement, the membrane rests on an annular supporting shoulder provided at the bottom of the housing recess. To fix the membrane within this bead-like housing recess, an annular spring element with central openings and spoke-like struts, which is likewise inserted into the housing recess and held there, is provided. The membrane is produced from a material available commercially under the name GORE-TEX® PTFE membranes.

In the case of a housing for a driving device, in particular for an adjustment drive of a sliding roof or of a window of a motor vehicle, known from published, non-prosecuted German patent application DE 196 35 180 A1, a housing opening is covered by a membrane that is permeable to gases and impermeable to liquids. Here, the membrane likewise lies in a bead-like depression in the housing and rests on a circumferential rim surrounding the opening at the bottom of the depression. In this known housing, the membrane is welded at least at the circumference of the opening to the housing wall surrounding the latter.

In the case of a housing for a drive unit known from published, non-prosecuted German patent application DE 10 2007 052 150 A1, the housing opening is once again arranged in a housing depression having side walls and is covered by a filter element that is permeable to gases and impermeable to liquids. To prevent the filter element from sliding out of the housing depression accidentally, it has extensions formed on its side walls, the extensions being oriented transversely to the direction of the opening and thus extending radially.

Common to the known housings is the fact that the membrane and/or the filter element lie in a housing depression surrounding the housing opening and are then secured against sliding out. However, a remaining section of the housing depression above the membrane is virtually unavoidable. Admittedly, this protects the membrane from damage, especially in connection with the manual fitting thereof. However, this inevitably also produces an unwanted collection point for water and/or dirt particles, and this is extremely undesirable.

SUMMARY OF THE INVENTION

It is accordingly an object of the invention to provide an improved housing for a driving device which overcomes the above-mentioned disadvantages of the prior art devices of this general type.

With the foregoing and other objects in view there is provided, in accordance with the invention a housing of a driving device. The housing contains a housing body having a housing opening, a gas-permeable membrane covering the housing opening, and a collar contour surrounding the housing opening. The collar contour being interrupted locally at a circumference by a local interruption. The local interruption of the collar contour extends at least approximately as far as a plane in which the housing opening lies.

The housing according to the invention for a driving device, in particular an electric motor adjustment drive for a motor vehicle, has a housing opening, which is covered by a membrane that is permeable to gas and, in particular, impermeable to liquid and which is surrounded by a collar contour, which is raised relative to the plane of the opening, i.e. projects upward on the outside of the housing. The membrane rests within the collar contour, which is interrupted locally at the circumference and, for this purpose, is preferably embodied in the manner of a notched crown with a number of collar teeth and collar grooves. On the one hand, this ensures that no water can accumulate in the region of the opening surrounded in a ring by the collar contour and hence above the membrane arranged therein. On the other hand, the membrane is protected from manual damage.

The housing opening is preferably in the gear housing of the drive and, in the gear housing, is expediently located in the region of the connection to the motor housing or pole can of the electric motor, the connection expediently being of the flange type. By this mechanical joining or interface, the interiors of the housings of the gear and of the electric motor are connected, thus allowing air admission and/or discharge to and from the electric motor, in particular, via the housing opening.

The collar contour forms an annular surface, which is spaced apart from the housing wall and is interrupted. The local interruption of the collar contour preferably extends as far as the plane of the opening in which the housing opening lies.

The collar contour is formed by at least two, preferably four, collar teeth and collar grooves. The circumferential arc length of the collar teeth and collar grooves should be at least approximately equal, or the arc length of the collar teeth is less than that of the collar grooves. It is expedient if the collar contour has a conical profile on the inner-wall side, i.e. the clear width within the collar contour tapers toward the housing opening, while the collar itself widens toward the housing opening since the thickness or width of the collar increases toward the housing opening.

An annular rim of the support, opening or aperture is preferably provided for the membrane between the collar contour and the housing opening. It is therefore particularly expedient for the membrane to be mounted within the collar contour on the housing side, on the housing or support rim surrounding the housing opening, and bonded there in a single operation, in particular by a combined stamping and welding device. The membrane is preferably fixed within the collar contour by ultrasonic welding.

Other features which are considered as characteristic for the invention are set forth in the appended claims.

Although the invention is illustrated and described herein as embodied in a housing of a driving device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are provided with the same reference signs in both figures.

Figure 1:
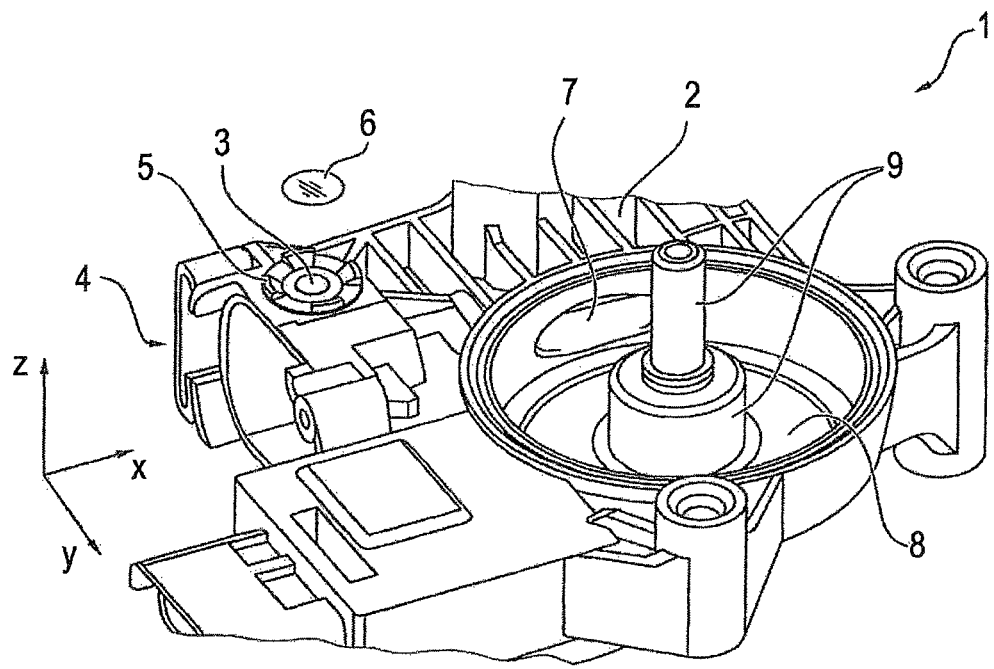
FIG. 1 is a diagrammatic, perspective view of a gear housing having a housing opening and a membrane arranged there-above in a preassembly state.

Referring now to the figures of the drawing in detail and first, particularly, to FIG. 1 thereof, there is shown a gear housing 2 of a driving device 1 of an electric motor adjustment drive for a motor vehicle. The housing having a housing opening 3 in the region of a flange-type connection point 4 for attaching the pole casing of an electric motor (not shown). The housing opening 3 is surrounded by a collar contour 5, which is interrupted a number of times around the circumference. Relative to the Cartesian coordinate system shown, the collar contour 5 extends in the z direction and thus projects beyond the housing opening 3, outside the gear housing 2. The housing opening 3 can be closed by a membrane 6, which is permeable to gas and impermeable to liquid, for which purpose the membrane 6 is placed in the annular collar contour 5, covering the housing opening 3, and is fixed there, preferably by ultrasonic welding.

At the end of the electric motor shaft, which extends in the x direction, the shaft carries a worm in a manner not shown specifically, the worm projecting through a passage opening 7 within the housing into an annular housing space 8, in which a worm wheel is mounted on a spindle 9. Via the passage opening 7, the worm meshes with the worm wheel, which is thus driven by the electric motor. Seated on the spindle 9 there is furthermore a non-illustrated cable drum, by use of the cable or Bowden cable of which, which is wound onto the drum, a vehicle window can be driven automatically along an adjustment path between an open and a closed position, using driving elements guided in guide rails for example.

Figure 2:
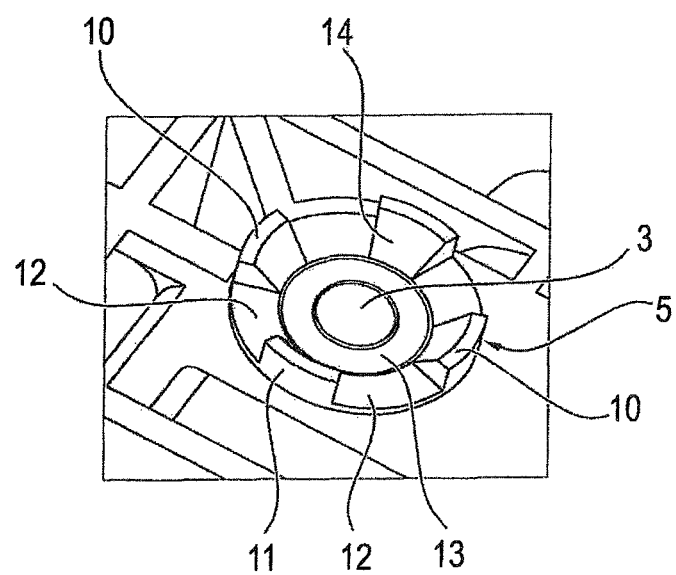
FIG. 2 is a perspective view of a detail from FIG. 1 on an enlarged scale showing the housing opening surrounded by a crown-like collar contour.

As is relatively clear from FIG. 2, the collar contour 5 surrounding the housing opening 3 in a ring forms an interrupted annular surface 10, which is spaced apart from the housing opening 3 in the z direction. The annular surface 10 thus lies in a plane which is outside the gear housing 2, above the plane in which the housing opening 3 lies in the z direction.

The collar contour 5, which is configured in the manner of a notched crown, is formed by a number of collar teeth 11 with collar grooves 12 situated there-between. The collar grooves 12 extend as far as the plane of the housing opening 3. An annular support (support surface or support rim) 13 is produced between the housing opening 3 and the collar teeth 11. The membrane 6 rests on this support rim 13 surrounding the housing opening 3 and is fixed there.

On the inner-wall side, the collar contour 5 has a conical profile since the collar teeth 11 are formed with an obliquely extending toothed inner wall or toothed inner side 14 on the side of the teeth facing the housing opening 3. This configuration of the collar contour 5 on the inner-wall side, in such a way that the contour tapers toward the housing opening 3, enables the membrane 6 to be inserted easily and, in particular, allows it to be centered around the central axis of the housing opening 3. The outside diameter of the annular support rim 13 and the outside diameter of the membrane 6 are at least approximately equal.

On the one hand, the collar contour 5 situated on the outside of the housing, which is crown-like and therefore interrupted, ensures that no water can accumulate above the membrane 6 and within the collar contour 5. On the other hand, the membrane 6 cannot be damaged by mishandling in the welded state.

In a housing of a radiator fan drive or of an adjustment drive for a sliding roof or the like, the housing opening 3 closed in a gas-permeable manner by the membrane 6 can also be provided with an at least locally interrupted collar contour 5, which extends outside the corresponding housing and thus reliably protects the membrane 6 from mechanical damage and from an accumulation of water or other liquids and dirt.

Moreover, the opening 3 and/or the collar contour 5 can have a geometrical shape that deviates from the ring or circular shape. Furthermore, the collar contour 5 can have just one interruption, e.g. in the form of a hole or of an opening in the circumference. In addition, the membrane can also be fixed in some other way, e.g. by means of adhesive bonding or the like.

LIST OF REFERENCE SIGNS 1 driving device
2 housing
3 housing opening
4 connection point
5 collar contour
6 membrane
7 passage opening
8 gear space
9 spindle
10 annular surface
11 collar tooth
12 collar groove
13 support/support rim
14 tooth inner wall/side

The invention claimed is:

1. A housing of a driving device, the housing comprising:
a housing body having a housing opening formed therein;
a gas-permeable membrane covering said housing opening; and
a collar contour surrounding said housing opening, said collar contour being interrupted locally at a circumference by a local interruption, said collar contour being formed of at least two collar teeth and collar grooves, said collar teeth defining an obliquely running inner wall on a side of said collar teeth facing said housing opening for tapering said collar contour toward said housing opening;
an annular support for said membrane, said annular support provided between said collar contour and said housing opening.

2. The housing according to claim 1, wherein:
said housing body has a housing wall; and
said collar contour forms an annular surface, which is spaced apart from said housing wall and is interrupted.

3. The housing according to claim 1, wherein a circumferential arc length of said collar teeth and said collar grooves are equal.

4. The housing according to claim 1, wherein said gas-permeable membrane is fixed or joined within said collar contour by means of ultrasonic welding.

5. The housing according to claim 1, wherein, in a single operation, said gas-permeable membrane is mounted on said annular support surrounding said housing opening within said collar contour and fixed there.

6. The housing according to claim 5, wherein said gas-permeable membrane is bonded by a combined stamping and welding device.

7. The housing according to claim 1, wherein said collar contour is formed by four said collar teeth and four said collar grooves.

8. The housing according to claim 1, wherein an arc length of said collar teeth is less than that of said collar grooves.

9. The housing according to claim 1, wherein: said local interruption of said collar contour extends at least approximately as far as a plane in which said housing opening lies.

10. The housing according to claim 1, wherein said collar contour tapers conically toward said housing opening on said inner wall.

11. An electric motor adjustment drive for a motor vehicle, comprising:
a housing containing a housing body having a housing opening formed therein, a gas-permeable membrane covering said housing opening, and a collar contour surrounding said housing opening, said collar contour being interrupted locally at a circumference by a local interruption, said collar contour being formed of at least two collar teeth and collar grooves, said collar teeth defining an obliquely running inner wall on a side of said collar teeth facing said housing opening for tapering said collar contour toward said housing opening;
an annular support for said membrane, said annular support provided between said collar contour and said housing opening.

* * * * *